No. 652,783. Patented July 3, 1900.
C. F. KADE.
REFRIGERATOR.
(Application filed Apr. 24, 1899.)
(No Model.) 2 Sheets—Sheet 1.
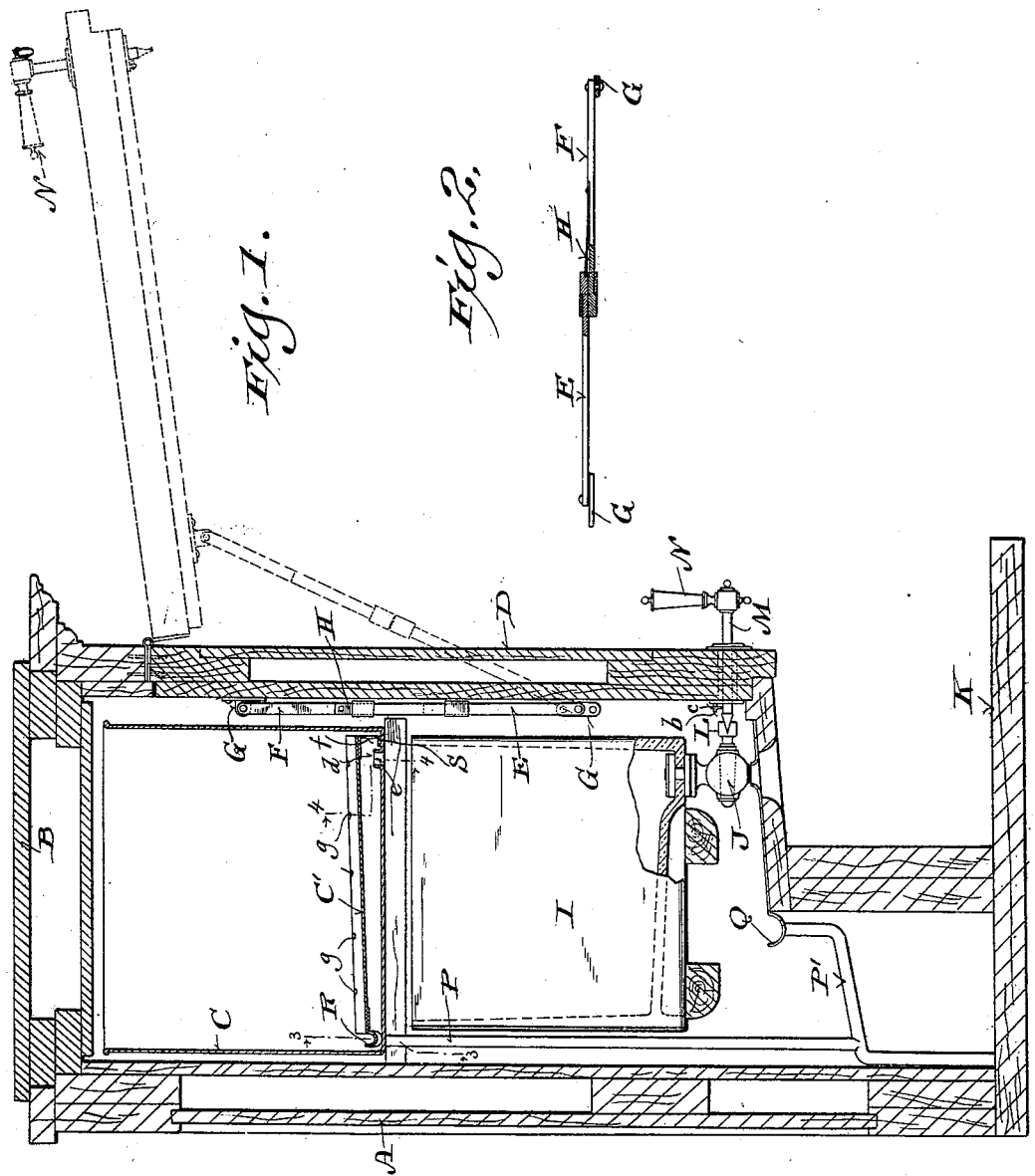

No. 652,783. Patented July 3, 1900.
C. F. KADE.
REFRIGERATOR.
(Application filed Apr. 24, 1899.)
(No Model.) 2 Sheets—Sheet 2.

Witnesses:
Geo. W. Young.
N. E. Oliphant.

Inventor
Charles F. Kade
By H. G. Underwood
Attorneys

THE NORRIS PETERS CO., PHOTO-LITHO., WASHINGTON, D. C.

UNITED STATES PATENT OFFICE.

CHARLES F. KADE, OF SHEBOYGAN, WISCONSIN, ASSIGNOR TO ISABELLA FRANCIS KADE AND KATHARINE FRANCIS WINTER, OF SAME PLACE.

REFRIGERATOR.

SPECIFICATION forming part of Letters Patent No. 652,783, dated July 3, 1900.

Application filed April 24, 1899. Serial No. 714,192. (No model.)

*To all whom it may concern:*

Be it known that I, CHARLES F. KADE, a citizen of the United States, and a resident of Sheboygan, in the county of Sheboygan and State of Wisconsin, have invented certain new and useful Improvements in Refrigerators; and I do hereby declare that the following is a full, clear, and exact description thereof.

My invention has for its object to provide simple economical refrigerators especially designed as coolers for soda-water syrups and beverages contained in jars having faucets operated from outside of said coolers; but certain features of the invention are applicable in household and other refrigerators. Therefore said invention consists in certain peculiarities of construction and combination of parts hereinafter particularly set forth with reference to the accompanying drawings and subsequently claimed.

Figure 4:
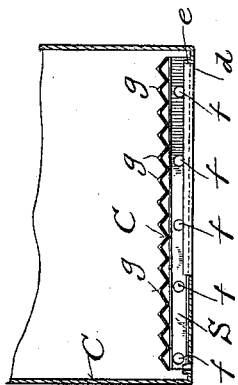
Figure 3:
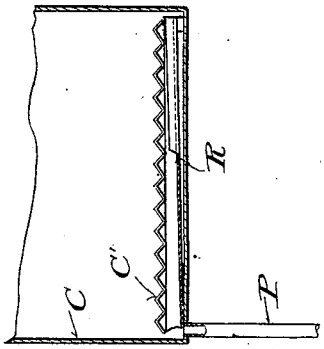
Figure 5:
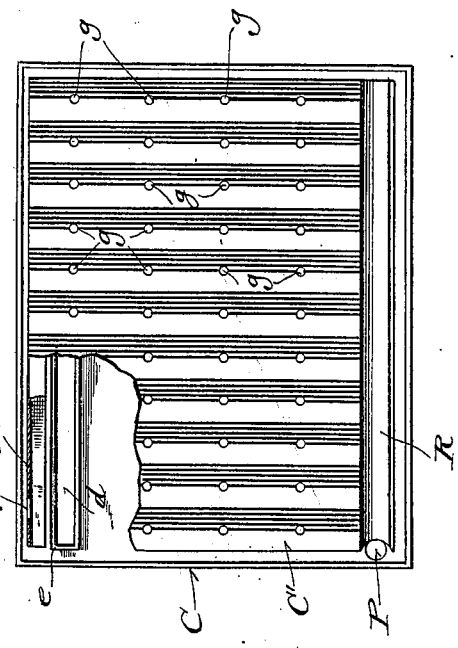

Figure 1 of the drawings represents a vertical transverse section view of a refrigerator embodying my improvements, and especially designed as a cooler for soda-water syrups and beverages contained in jars having faucets operated from outside the cooler; Fig. 2, a detail partly-sectional view of a stay-brace for a hinged side section of the refrigerator herein particularly set forth; Figs. 3 and 4, detail sectional views respectively indicated by lines 3 3 and 4 4 in the first figure; and Fig. 5, a plan view of the ice box and rack, the latter being partly broken.

Referring by letter to the drawings, A represents a double-wall casing such as is common in refrigerator construction, a portion of the upper part of the casing being in the form of a lid B, that is raised to permit access to the ice-box C or the removal of the latter from its supports in said casing. A front section D of the casing is hinged at its upper end and has outward swing in an upward direction. Telescopic braces are employed in connection with ends of the casing A and its hinged front section D, and, as best shown in Fig. 2, each of these braces comprises a pair of bars E F, each of which has an inner band extremity engaged by the other, the outer extremity of each bar being in pivotal connection with a bracket G, that is made fast to an end of the casing or said hinged section thereof, as herein shown. The inner portion of bar F is recessed to receive a flat spring H, made fast at one end thereto, and this spring is positioned to have its free end automatically engage a notch in the inner extremity of the other bar E when the brace is extended its full length, whereby said spring acts as a stop to prevent contraction of said brace.

Jars I are supported in the casing below the ice-box and have depending faucets J, that register with bottom openings in said casing, that portion of the latter provided with said openings being projected forward of the remainder over a counter or shelf K, as herein shown. The plugs of the faucets have angularly-notched heads L for the free engagement of correspondingly-shaped inner ends of stems M, that have their bearings in the hinged front section D of the aforesaid casing, the outer ends of these stems being provided with handles N, by which they are turned to operate the faucet-plugs when in engagement therewith. Stops b, projecting in from the casing-section D, and lugs c on the stems may be employed to limit rotary movement of said stems.

From the foregoing it will be appreciated that when the casing-section D is swung up all of the stems are thus disengaged from the faucet-plugs at the same time the entire jar-space is opened. If the jars be removed, the space for the same may be utilized for exhibiting commodities of various kinds, a show-case front being substituted for the section D of the casing.

The ice-box C is provided with a bottom air-slot d, having an upwardly-extending continuous guard-flange e, and fitting another opening in said bottom is a drain-tube P, a branch P' of which connects with a trough Q, constituting part of the casing-lining under the jars above specified, the overhanging bottom portion of the casing and its lining being somewhat inclined toward said spout.

The ice-rack C' in box C is preferably of sheet metal and transversely corrugated, this rack being provided with a depending longitudinal trough R, that rests upon the bottom of said box, other means of support being provided opposite the trough to give said rack an inclination that facilitates drainage. The trough leads to the drain-tube aforesaid, and the means opposite the trough for the support of said ice-rack is herein shown as being preferably an angular strip S of sheet metal having its vertical portion provided at intervals with apertures $f$ to facilitate air circulation. In order to further facilitate the circulation of air, the apexes of the upwardly-projecting ridges of the ice-rack, herein particularly set forth, are provided at intervals with apertures $g$, that may be circular or otherwise and of such dimension as may be found best in practice.

Having thus described my invention, what I claim as new, and desire to secure by Letters Patent, is—

1. A refrigerator having an upper ice-compartment provided with a lid, another compartment immediately below the one aforesaid, jars arranged in the lower of said compartments to have their faucets register with bottom openings in an overhang of same, a hinged upwardly-swinging closure for the jar-compartment, self-locking telescopic braces for holding the closure open on its hinges, and outside handles having stems arranged to turn in said jar-compartment closure, the inner ends of these stems being made to have free angular engagement with the plugs of said faucets when the aforesaid jar-compartment closure is swung down.

2. A refrigerator ice-box having a bottom air-slot, a corrugated ice-rack having apertures in the apexes of its upwardly-extending ridges, a drain-trough depending from the ice-rack at a right angle to the corrugations thereof to constitute a support, and another ice-rack support opposite the trough in the form of a depending angular strip provided at intervals of its length with transverse apertures.

In testimony that I claim the foregoing I have hereunto set my hand, at Sheboygan, in the county of Sheboygan and State of Wisconsin, in the presence of two witnesses.

CHARLES F. KADE.

Witnesses:
ALFRED O. WINTER,
FRED H. POTTLING.